United States Patent [19]

Tsukamoto et al.

[11] Patent Number: 5,174,423
[45] Date of Patent: Dec. 29, 1992

[54] LOCK-UP APPARATUS IN TORQUE CONVERTER

[75] Inventors: Kazumasa Tsukamoto; Takuji Taniguchi; Hideji Katoh; Koji Maeda, all of Anjo; Kunihiro Iwatsuki, Toyota, all of Japan

[73] Assignees: Aisin AW Co., Ltd.; Toyota Jidosha Kabushiki Kaisha, both of Japan

[21] Appl. No.: 733,079

[22] Filed: Jul. 18, 1991

Related U.S. Application Data

[63] Continuation of Ser. No. 501,783, Mar. 28, 1990, abandoned.

Foreign Application Priority Data

Mar. 28, 1989 [JP] Japan .................. 1-76352

[51] Int. Cl.$^5$ .............................. F16D 33/00
[52] U.S. Cl. ........................ 192/3.29; 192/33
[58] Field of Search ................... 192/3.29, 3.3

[56] References Cited

U.S. PATENT DOCUMENTS

| | | | |
|---|---|---|---|
| 3,497,043 | 2/1970 | Leonard | 192/3.3 X |
| 3,730,315 | 5/1973 | Annis et al. | 192/3.3 |
| 3,734,251 | 5/1973 | Annis et al. | 192/3.3 |
| 4,049,093 | 9/1977 | Vukovich et al. | 192/3.3 |
| 4,271,939 | 6/1981 | Iwanaga et al. | 192/3.3 |
| 4,301,900 | 11/1981 | Sunohara et al. | 192/3.3 |
| 4,377,226 | 3/1983 | Chevalier et al. | 192/3.3 |
| 4,406,355 | 9/1983 | Bionaz | 192/3.3 |
| 4,735,297 | 4/1988 | Koshimo | 192/3.29 |
| 4,785,923 | 11/1988 | Ushijima | 192/3.3 |

FOREIGN PATENT DOCUMENTS 211160 10/1985 Japan .................. 192/3.3

Primary Examiner—Leslie A. Braun
Assistant Examiner—Nicholas Whitelaw
Attorney, Agent, or Firm—Lorusso & Loud

[57] ABSTRACT

A lock-up apparatus in a torque converter includes a first oil chamber (25) and a second oil chamber (26) delimited by a lock-up piston (21), a first oil line system (A) communicating with the first oil chamber (25), and a second oil line system (B) communicating with the second oil chamber (26). An orifice (36) and an oil line (37) for directly communicating the first oil line system (A) and the second oil chamber (26) are provided in an output shaft (20) and a turbine hub (19), respectively. Accordingly, the first oil chamber (25) and the second oil chamber (26) are not directly communicated. As a result, not only is shock produced at release from the locked up state mitigated by the orifice (36) and oil line (37), but it is also possible to reliably prevent a decline in transmission torque capacity in the lock-up ON state.

13 Claims, 1 Drawing Sheet

LOCK-UP APPARATUS IN TORQUE CONVERTER

This application is a continuation of application Ser. No. 07/501,783, filed Mar. 28, 1990, now abandoned.

BACKGROUND OF THE INVENTION

This invention relates to a fluid-type torque converter used in the transmission of an automotive vehicle, by way of example. More particularly, the invention relates to a lock-up apparatus in a torque converter for directly mechanically coupling a driving side and a driven side.

In general, a lock-up apparatus of this type is adapted to directly couple a driving-side member and a driven-side member mechanically by connecting a lock-up clutch piston on the driven side and a converter on the driving side via a friction member provided, for example, on the lock-up clutch piston. In this case, the operation of the lock-up piston is controlled by suitably controlling the hydraulic pressure of first and second oil chambers delimited by a clutch plate on either side thereof. When the lock-up apparatus is in the directly coupled state, power from the engine is transmitted with almost no loss due to slip.

In a lock-up apparatus of this kind, shock is produced when the directly coupled state is established (lock-up ON) or when the apparatus is released from the directly coupled state (lock up OFF). Though the shock produced at lock-up ON does not have much effect, the shock produced at lock up OFF is comparatively large and therefore undesirable in terms of drive feeling.

In an attempt to solve this problem, generally the lock-up clutch piston is provided with an orifice for communicating the first and second oil chambers, as disclosed for example in the specification of Japanese Patent Publication (KOKOKU) No. 63-5625. With an orifice of this kind, some of the working fluid supplied to the first oil chamber at lock-up OFF flows into the second oil chamber through the orifice so that the apparatus is gradually released from the directly coupled state. As a result, the shock sustained at lock-up OFF is mitigated.

However, since the orifice is provided in the lock-up clutch piston, the first and second oil chambers are in direct communication via the orifice even in the lock-up ON state. Consequently, the pressure in the second oil chamber leaks through the orifice in the lock-up ON state so that the pressure difference between the second oil chamber and first oil chamber declines. A problem that results is a decline in the transmission torque capacity of the lock-up clutch.

SUMMARY OF THE INVENTION

An object of the present invention is to mitigate shock at lock-up OFF to the greatest extent possible.

Another object of the present invention is to assuredly prevent a decline in the transmission torque capacity by minimizing the drop in the pressure difference between the oil chambers on the two sides of the lock-up piston in the lock-up ON state.

According to the present invention, the foregoing objects are attained by providing a lock-up apparatus in a torque converter, comprising a first oil chamber and a second oil chamber delimited by a lock-up piston, a first oil line system communicating with the first oil chamber for supplying and discharging working fluid, and a second oil line system communicating with the second oil chamber for supplying and discharging working fluid, wherein when pressure in the second oil chamber is greater than pressure in the first oil chamber, the lock-up piston is operated by the pressure difference to directly couple a driving-side member and a driven-side member mechanically, characterized in that an orifice is provided for directly communicating the first oil line system and either the second oil chamber or the second oil line system.

Further, the invention is characterized in that the orifice extends diametrically of a rotary member.

Further, the invention is characterized in that the rotary member is an output shaft.

Further, the invention is characterized in that the first oil line system is disposed in the rotary member.

In accordance with the torque converter lock-up apparatus according to the invention constructed as set forth above, an orifice is provided for directly communicating the first oil line system and either the second oil chamber or the second oil line system. As a result, not only is shock produced at release from the locked up state mitigated by the orifice, but it is also possible to reliably prevent a decline in transmission torque capacity in the lock-up ON state.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENT

Figure 1:
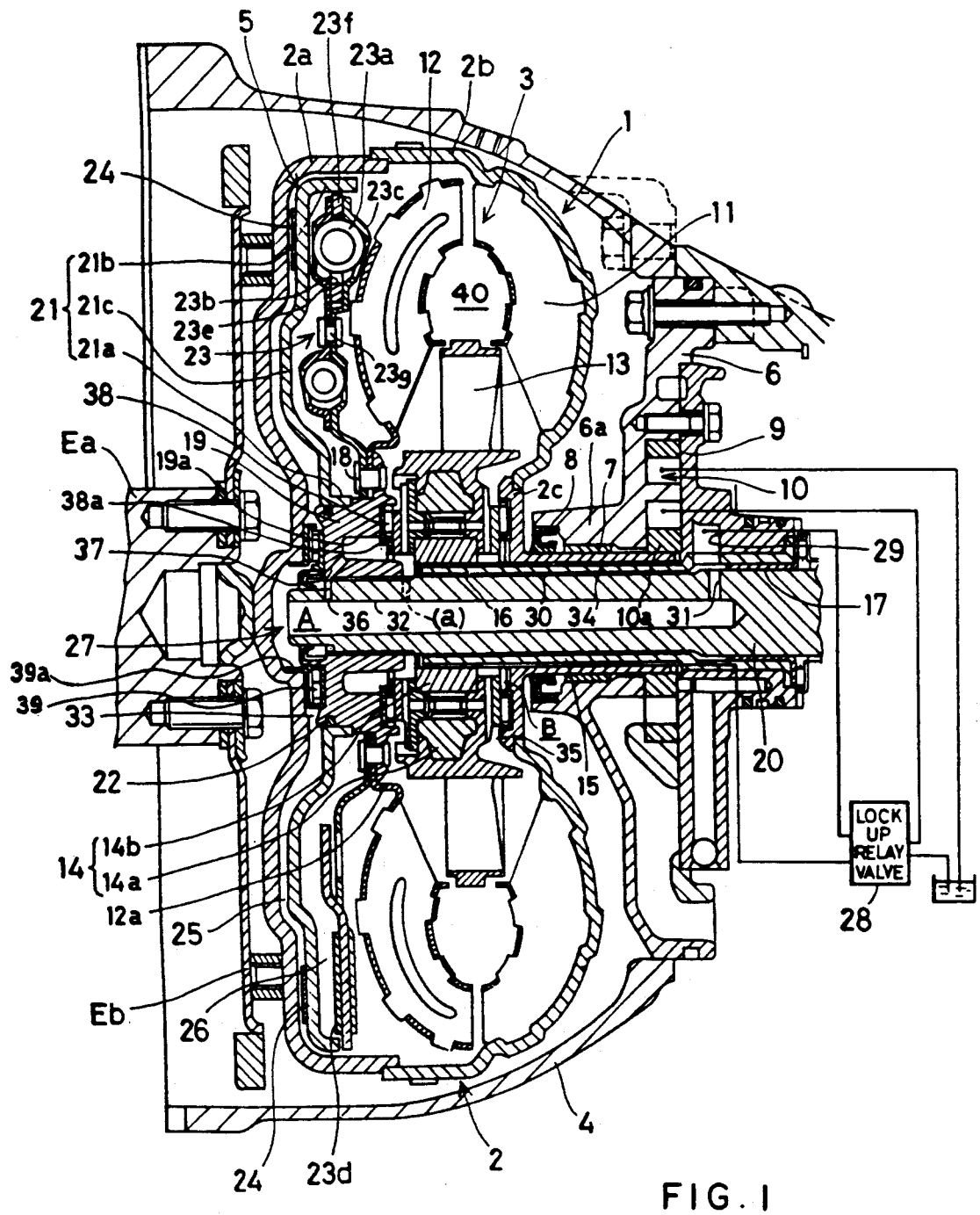
FIG. 1 is a view schematically illustrating an embodiment of a lock-up apparatus in a torque converter according to the present invention.

An embodiment of the present invention will now be described with reference to the drawing.

As shown in FIG. 1, a torque converter 1 comprises a power transmission case 2 forming the case of the torque converter, and a fluid transmission unit 3 for transmitting power via a working fluid inside the power transmission case 2. The torque converter 1 is housed within a transmission case 4. A lock-up apparatus 5 is disposed between the power transmission case 2 and the fluid transmission unit 3. An automatic transmission, by way of example, is delimited within the transmission case 4 by a partition 6.

The power transmission case 2 comprises a front cover 2a, a rear cover 2b welded to the front cover 2a, and a sleeve 2c welded to the rear cover 2b. These covers accommodate the lock-up apparatus 5. The front cover 2a is connected to an engine crankshaft Ea via a drive plate Eb. The sleeve 2c is freely rotatably supported via a metal bearing 7 and an oil seal 8 within a columnar portion 6a formed on the partition 6 and projecting forwardly of the same. The rear end of the sleeve 2c is connected by key means to a slot in an outer gear wheel 10a of a gear oil pump 10 provided inside an oil pump housing formed by the partition 6 and a rear cover 9.

The fluid transmission unit 3 comprises a pump impeller 11 formed integral with the rear cover 2b for causing the working fluid to flow from the inner circumferential side to the outer circumferential side by centrifugal force owing to rotation of the rear cover 2b, a turbine impeller 12 provided in opposition to the impeller 11 for receiving the working fluid caused to flow to the outer circumferential side by the pump impeller 11, and for allowing the working fluid to flow toward the inner circumferential side again, whereby the rotation of the pump impeller 11 is transmitted thereto, and a stator 13 for enlarging the transmitted torque by changing the direction of working fluid flow between the inner circumferential sides of the pump impeller 11 and turbine impeller 12. The pump impeller 11 and the turbine impeller 12 define a central chamber 40 therebetween. A one-way clutch 14 capable of rotating in only one direction has an outer race 14a secured to the inner periphery of the stator 13 by casting. The one-way clutch 14 also has an inner race 14b splined to the outer circumferential portion of the front end of a fixed sleeve 15 connected to the rear cover 9 forming the oil pump housing. When the flow velocity of the working fluid which flows through the interior of the stator 13 exceeds a fixed value, the stator 13 is rotated in one direction by the one-way clutch 14. When the stator 13 rotates, the torque converter 1 no longer enlarges the torque and acts as a simple Froude coupling.

A turbine flange 12a supporting the turbine impeller 12 is fixed to the turbine hub 19 by a rivet 18. The torque converter 1 has an output shaft 20 rotatably supported via metal bearings 16, 17 at the front and rear end portions of the fixed sleeve 15 on the inner periphery thereof. The turbine hub 19 is splined to the output shaft 20 and is secured against movement in the axial direction.

The lock-up apparatus 5 is equipped with a lock-up piston 21 comprising a columnar portion 21a on the inner circumferential side, a columnar portion 21b on the outer circumferential side, and an annular plate 21c. The inner columnar portion 21a of the lock up piston 21 is fitted onto the outer circumferential portion of the turbine hub 19 via a seal ring 22 so as to be freely slidable in the axial direction.

The lock-up piston 21 is provided with a damper mechanism 23, which is equipped with a group of dampers 23a each comprising a compression coil spring, a driven plate 23d comprising a first guide plate 23b and a second guide plate 23c internally accommodating the dampers 23a so that these may slide freely in the circumferential direction, and a drive plate 23f splined at its outer periphery to the outer columnar portion 21b and retained between the first guide plate 23b and second guide plate 23c so as to be freely slidable in the circumferential direction, the drive plate 23f having the dampers 23a arranged in its interior and including a damper-urging window 23e so that the dampers 23a are urged by the sliding motion of the driven plate 23d.

The first guide plate 23b is fastened to the turbine hub 19 along with a turbine flange 12a by means of the rivet 18. The first and second guide plates 23b, 23c are connected to each other by a rivet 23g. A clutch facing 24 is affixed to the annular plate portion 21c of the lock-up piston 21.

A first oil chamber 25 and a second oil chamber 26 are defined by the lock-up piston 21 on either side thereof. When the oil pressure in the first oil chamber 25 is higher than the oil pressure in the second oil chamber 26, the lock-up piston 21 is located at a position retracted with respect to the front cover 2a, as shown in the Figure, and the clutch facing 24 does not engage the front cover 2a. In this state, the drive side of the torque converter 1, namely the pump side, and the driven side, namely the turbine side, will not engage.

When the oil pressure in the first oil chamber 25 drops so that a prescribed pressure difference develops between this oil pressure and that in the second oil chamber 26, the lock-up piston 21 is slid toward the front cover 2a by the pressure difference, so that the clutch facing 24 abuts against the front cover 2a. In this state, the pump side and the turbine side engage.

Working fluid supply means 27 for supplying the first oil chamber 25 and the second oil chamber 26 with the working fluid will now be described.

The working fluid supply means 27 has a first oil line system A and a second oil line system B. The first oil line system A comprises an oil line 29 provided in the rear cover 9 of the oil pump housing, an oil line 30 formed between the output shaft 20 and the fixed sleeve 15 and communicating with the oil line 29, an oil line 32 formed in the output shaft 20 along its central axis and communicating with the oil line 29 via an oil line 31, and an oil line 33 formed between the front cover 2a and the turbine hub 19 and communicating with oil line 32, and further communicating with the first oil chamber 25 via an oil line formed in a race 39a which is on the front cover 2a side of a thrust bearing 39 disposed between the front cover 2a and the turbine hub 19. The second oil line system B comprises an oil line 34 formed between the sleeve 2c and the fixed sleeve 15 and communicating with the lock-up valve 28, and an oil line 35 formed between the sleeve 2c and the one-way clutch 14 and communicating the oil line 34 with the central oil chamber 26 between the pump impeller 11 and the turbine impeller 12.

Changeover between supply and discharge of the working fluid of the first oil line system A and second oil line system B is controlled by the lock-up relay valve 28.

The front end of the output shaft 20 is formed to have an orifice 36 which communicates the oil line 32 with the outer peripheral surface of the output shaft 20. The orifice 36 is constituted by a radially extending hole. Since the output shaft 20 is provided with other holes as well, the orifice 36 can be drilled along with these other holes at the same time. Accordingly, a special drilling step for forming the orifice 36 is unnecessary, and the orifice 36 can be formed in a simple manner.

The turbine hub 19 is formed to have a hole 37 communicating the orifice 36 and the second oil chamber 26. In this case, the hole 37 opens to a thickened portion 19a of the turbine hub 1. The thickened portion 19a forms an oil line communicating the hole 37 and the second oil chamber 26. By thus utilizing the thickened portion 19a as a portion of an oil line, the hole 37 can be formed with comparative ease. Thus, the oil line 32 of the first oil line system A and the second oil chamber 26 are communicated via the orifice 36.

The operation of the lock-up apparatus 5 in the torque converter 1 thus constructed will now be described.

(a) Operation when the lock-up relay valve 28 is set in such a manner that the lock-up apparatus 5 will assume the lock-up OFF state.

At this time, the valve is set so as to form a circulation oil line through which the working fluid is supplied to the first oil chamber 25 inside the power transmission case 2 via the first oil line system A and discharged from the second oil chamber 26 via the second oil line system B.

In this set state, the supply of the working fluid to the interior of the power transmission case 2 is carried out between the front cover 2a and the lock-up piston 21. As a result, the lock-up piston 21 is moved to the right in the Figure by the pressure difference between first oil chamber 25 and the second oil chamber 26, so that the clutch facing 24 and the front cover 2a are pulled away from each other. In other words, frictional engagement between the clutch facing 24 and the front cover 2a does not take place, and the lock-up apparatus 5 assumes the lock-up OFF state.

As a result of the foregoing, engine drive torque is transmitted to the pump impeller 11 via the drive plate Eb and power transmission case 2; hence, the pump impeller 11 rotates. Owing to this rotation of the pump impeller 11, the working fluid in the power transmission case 2 flows in circulatory fashion from the pump impeller 11 to the turbine impeller 12 and stator 13 and then back to the pump impeller 11. Since a force acts upon the turbine impeller 12 owing to the circulatory flow of the working fluid, the turbine impeller 12 rotates. In this case, the drive torque is enlarged and transmitted by the stator 13. Owing to rotation of the turbine impeller 12, the output shaft 20 is rotated via the turbine hub 19, and the drive torque is further transmitted to, say, an automatic transmission OD. Thus, the torque converter 1 performs a converting action, in which the working fluid is transmitted with torque being enlarged. When the rotational velocity of the turbine impeller 12 exceeds a predetermined velocity, the out-flow direction of the working fluid flowing out of the turbine impeller 12 changes and exceeds the inclination of the vanes of the stator 13, so that the working fluid abuts against the back faces of the stator vanes. The stator 13 therefore idles. As a consequence, the torque converter 1 performs the function of an ordinary Froude coupling and does not increase torque.

Thus, torque is not transmitted via the lock-up apparatus 5.

(b) Operation when the lock-up relay valve 28 is set in such a manner that the lock-up apparatus 5 will assume the lock-up ON state.

The working fluid supply means 27 supplies the working fluid to the second oil chamber 26 inside the power transmission case 2 via the second oil line system B, and discharges the working fluid from the first oil chamber 25 via the first oil line system A. As a result, the pressure in the second oil chamber 26 rises and the pressure in the second oil chamber 26 falls, thereby producing a pressure difference between the second oil chamber 26 and the first oil chamber 25. This pressure difference causes the lock-up piston 21 to slide leftward in the Figure so that the clutch facing 24 abuts against the front cover 2a. More specifically, the lock-up ON state is established, in which the power transmission case 2 on the driving side and the output shaft 20 on the driven side are directly coupled. In this case, since the orifice 36 communicating the second oil chamber 26 and the oil line 32 is formed in the output shaft 20 and there is no direct communication between the second oil chamber 26 and the first oil chamber 25, the influence of the working fluid leakage via the orifice 36 is much less in comparison with the conventional torque converter lock-up apparatus, in which the orifice 36 is provided in the lock-up piston 21 and the second oil chamber 26 and first oil chamber 25 are directly communicated. Accordingly, there is almost no decline in the transmission torque capacity of the lock-up apparatus 5. In particular, since high-speed rotation is often taking place when the lock-up ON state is established, a comparatively large centrifugal force acts upon the working fluid at such time. When the bore of the orifice 36 extends in the radial direction of the output shaft 20, as it does in this embodiment, this centrifugal force opposes the flow of the working fluid which flows via the orifice 36 from the second oil chamber 26 to the oil line 32. In other words, the pressure difference between the second oil chamber 26 and the oil line 32 is negated and therefore the leakage of working fluid through the orifice 36 is suppressed. As a result, a decline in the transmission torque capacity is suppressed even further.

In the lock-up ON state, the drive torque from the engine is directly transmitted from the power transmission case 2 to the output shaft 20 with almost no loss.

When the lock-up relay valve 28 is changed over in order to change from the lock-up ON state to the lock-up OFF state, the working fluid is supplied to the first oil chamber 25 through the first oil line system A. In this case, some of the working fluid flows into the second oil chamber 26 via the orifice 36 until the clutch facing 24 parts from the front cover 2a, and therefore the pressure rise in the first oil chamber 25 takes place comparatively gently. As a consequence, the shock at disengagement of the clutch facing 24 and front cover 2a is mitigated and any deterioration in drive feeling is almost completely eliminated.

The working fluid which flows through the orifice 36 effectively lubricates the bearing 38 interposed between the turbine hub 19 and the stator 13. More specifically, the thickened portion 19a of the turbine hub 19 acts as an oil reservoir, and working fluid which has accumulated here flows into the bearing 38 to lubricate the same.

The present invention is not limited to the above-described embodiment but can be modified in various ways.

By way of example, though the orifice 36 is provided so as to extend radially with respect to the center axis of the output shaft 20, it is not absolutely essential that the orifice 36 be radially directed. More specifically, the orifice 36 can be provided to extend diametrically while also being extended in the axial direction. Further, the orifice can be provided so as to extend in the circumferential direction of the output shaft 20 as well as in the diametric direction thereof. In other words, it will suffice if the orifice 36 is formed in such a manner that the centrifugal force produced by rotation of the output shaft 20 will act upon the proper quantity of working fluid.

In addition, though the orifice 36 in the foregoing embodiment is provided in the front end portion of the output shaft 20 and the turbine hub 19 is provided with the hole 37 communicating the orifice 36 and the second oil chamber 26, it is permissible to provide the orifice 36 at a position (a) where it will open on to a space constituted between the fixed sleeve 15 and the turbine hub 19. In this case, the oil line 37 provided in the turbine hub 19 can be deleted. However, since this is a portion where the load based on the transmitted torque is comparatively great, it is required that the strength of the output shaft 20 be made large enough to withstand the load. Further, the orifice 36 may be provided in the fixed sleeve 15 so as to communicate the oil line 30 formed between the output shaft 20 and the fixed sleeve 15 with the oil line 34 formed between the sleeve 2c and the fixed sleeve 15. In other words, it will suffice if the orifice 36 is so provided as not to directly communicate the first oil chamber 25 and the second oil chamber 26.

If an arrangement is adopted in which the orifice 36 is provided with a check valve that permits flow solely from the oil line 32 to the second oil chamber 26, the orifice effect will become comparatively greater when a transition is made from the lock-up ON state to the lock-up OFF state, and comparatively smaller when a transition is made from the lock-up OFF state to the lock-up ON state. In other words, the orifice 36 can be made a kind of variable orifice. In this case, the check valve used can be one having a well-known structure. By thus varying the orifice effect, shock produced at changeover between the lock-up ON state and the lock-up OFF state can be effectively mitigated even if the effect of the shock differs.

Furthermore, though the lock-up apparatus described in the foregoing embodiment has the clutch facing 24 secured to the lock up piston 21, the invention is applicable also to a lock-up apparatus in which the clutch facing 24 is attached to the front cover 2a.

Thus, as evident from the foregoing description, there is provided a lock-up apparatus in a torque converter having a first oil chamber and a second oil chamber delimited by a lock-up clutch piston, a first oil line communicating with the first oil chamber for supplying and discharging working fluid, and a second oil line communicating with the second oil chamber for supplying and discharging the working fluid, wherein when pressure in the second oil chamber is greater than pressure in the first oil chamber, the lock-up clutch piston is operated by the pressure difference to directly couple a driving side and a driven side mechanically, characterized in that a driven-side rotary shaft formed to have the first oil line is formed to include an orifice for directly communicating the second oil chamber or the second oil line with the first oil line. Therefore, the first and second oil chambers are not directly communicated by the orifice. As a result, not only is shock produced at release from the locked up state mitigated by the orifice, but it is also possible to reliably prevent a decline in transmission torque capacity due to pressure leakage via the orifice in the lock-up ON state.

As many apparently widely different embodiments of the present invention can be made without departing from the spirit and scope thereof, it is to be understood that the invention is not limited to the specific embodiments thereof except as defined in the appended claims.

What is claimed is:

1. A hydraulic power transmission for driving a vehicle with power received from an engine crankshaft, said hydraulic power transmission comprising:

an outlet shaft having an exterior cylindrical surface and a central passage defining an interior cylindrical surface;

a driving member connected to the engine crankshaft;

a pump impeller connected to the driving member;

a turbine hub mounted on said output shaft and fixed against rotation relative to said output shaft;

a turbine impeller hydraulically driven by the pump impeller, said turbine impeller being rigidly fixed to said turbine hub;

a lock-up clutch including a clutch plate extending radially from said turbine hub and a clutch facing fixed to said clutch plate, said clutch plate being slidably mounted for axial movement between (1) a lock-up position wherein said clutch facing is frictionally engaged with said driving member to establish a direct mechanical coupling between said driving member and said output shaft and (2) a disengaged position wherein said clutch facing is separated from said driving member;

a release chamber provided between the driving member and the lock-up clutch for supplying and draining a hydraulic fluid;

a central chamber provided between the pump impeller and the turbine for supplying and draining the hydraulic fluid;

hydraulic fluid supply means for supplying the hydraulic fluid;

hydraulic fluid changeover means for supplying the hydraulic fluid from the hydraulic fluid supply means either to the release chamber to disengage said lock-up clutch or to the central chamber to engage said lock-up clutch while draining the release chamber;

a first oil passage including said central passage in the center of the output shaft and providing fluid ;communication between said hydraulic changeover means and said release chamber;

a second oil passage providing fluid communication between said central chamber and said hydraulic fluid changeover means; and orifice means for providing direct constant communication between said first oil passage and said central chamber, said orifice means comprising a first conduit formed in said turbine hub and opening to said central chamber at a point on a surface of said turbine hub radially inward of said lock-up clutch and said turbine impeller;

whereby said lock-up clutch is engaged and disengaged to or from the driving member in response to a difference in hydraulic fluid pressure between said release chamber and said central chamber.

2. The hydraulic power transmission according to claim 1, wherein said driving member is a case of the hydraulic power transmission and said lock-up clutch is slidably mounted on the turbine hub for axial sliding movement while fixed against rotation relative to the output shaft.

3. The hydraulic power transmission according to claim 2, wherein said hydraulic power transmission is a torque converter including a stator.

4. The hydraulic power transmission of claim 1 wherein the hydraulic pressure in said central chamber is higher than that in said release chamber for engagement of said lock-up clutch with said driving member in said lock-up position and wherein, during said engagement, flow through said orifice means from said central chamber to said release chamber is limited by centrifugal force acting on said hydraulic fluid in said central chamber.

5. The hydraulic power transmission of claim 1 wherein said exterior cylindrical surface and said interior cylindrical surface define an annular wall therebetween and wherein said orifice means further comprises:

a second conduit extending from an interior port formed in the interior cylindrical surface of said output shaft, through said annular wall, to an exterior port formed in the exterior cylindrical surface of said output shaft; and wherein said first conduit extending through said turbine hub provides fluid communication between said exterior port and said central chamber.

6. The hydraulic power transmission of claim 1 wherein said turbine hub is splined to said output shaft.

7. The hydraulic power transmission of claim 6 wherein said turbine hub is fixed against axial movement relative to said output shaft.

8. The hydraulic power transmission of claim 1 wherein said lock-up clutch further includes a clutch hub to which said annular plate is fixed.

9. The hydraulic power transmission of claim 7, wherein said clutch hub is slidably mounted on said turbine hub.

10. The hydraulic power transmission of claim 5 wherein said exterior port is radially aligned with said interior port.

11. The hydraulic power transmission of claim 1 further comprising a damper fixed to said turbine hub and radially extending from said turbine hub between said turbine impeller and said annular plate.

12. The hydraulic power transmission of claim 11, wherein said damper includes:
   a driven plate having a plurality of windows; and
   a plurality of dampers slidably mounted on said driven plate, one damper being associated with each of said windows for sliding motion relative to the associated window.

13. The hydraulic power transmission of claim 11 wherein said turbine impeller and said damper are riveted to said turbine hub.

* * * * *